F. ADAMS.
REPRODUCER FOR TALKING MACHINES.
APPLICATION FILED JAN. 31, 1920.

1,344,931.   Patented June 29, 1920.

WITNESS:
Rob.R.Kitchel

INVENTOR
Fred Adams
BY
Augustus B. S. Toughton
ATTORNEY.

UNITED STATES PATENT OFFICE.

FRED ADAMS, OF PHILADELPHIA, PENNSYLVANIA, ASSIGNOR TO THE PERFEK'TONE CORPORATION, OF PHILADELPHIA, PENNSYLVANIA, A CORPORATION OF MARYLAND.

REPRODUCER FOR TALKING-MACHINES.

1,344,931.   Specification of Letters Patent.   Patented June 29, 1920.

Application filed January 31, 1920. Serial No. 355,428.

*To all whom it may concern:*

Be it known that I, FRED ADAMS, a citizen of the United States, residing at Philadelphia, in the county of Philadelphia and State of Pennsylvania, have invented a new and useful Reproducer for Talking-Machines, of which the following is a specification.

A sound box body composed of relatively soft rubber possesses acoustical advantages, but, by reason of its flexibility, it is likely to be distorted, when handled, with the result that the diaphragm, seated in its rubber walls, is broken or injured.

The principal object of the present invention is to avoid the above mentioned defect and disadvantage and to protect the diaphragm while permitting the sound box to be handled and adjusted on the tone arms and while retaining the acoustical advantages of a soft rubber and flexible sound box body.

To this and other ends hereinafter set forth the invention, stated in general terms, comprises the combination with a sound box body composed of rubber soft enough to endanger a diaphragm seated in the interior of its rubber wall, of a rigid or metal guard ring conforming to the exterior surface of the portion of the rubber wall that supports the diaphragm and carried thereby, and the invention comprises the improvements to be presently described and finally claimed.

In the following description reference will be made to the accompanying drawings forming part hereof and in which—

Figure 1:
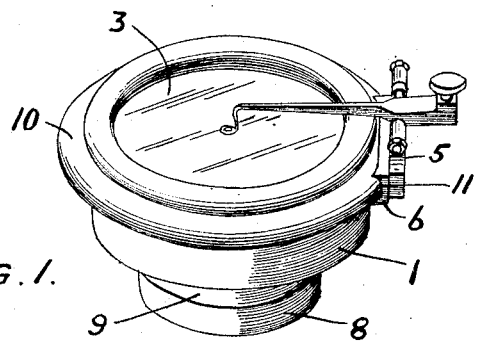
Figure 1, is a perspective view of a reproducer showing a rubber sound box body and a guard ring mounted thereon and embodying features of the invention.
Figure 2:
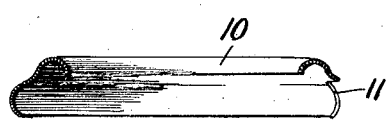
Figs. 2 and 3, are a sectional and an elevational view of the guard ring detached.
Figure 3:
Figure 4:
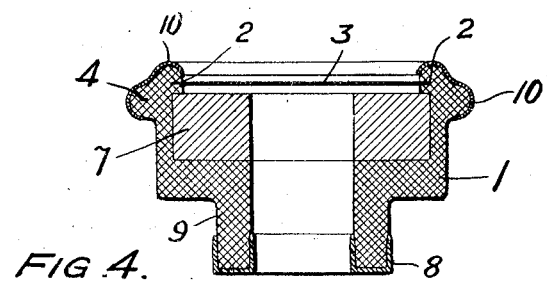
Fig. 4, is a longitudinal sectional view of the sound box body shown in Fig. 1.

In the drawings 1, is a sound box body composed of rubber and internally grooved as at 2, for the reception of the diaphragm 3, and while such a sound box produces good music still it is soft enough to endanger the diaphragm 3, when grasped from the outside by the hand, for example, in order to fit it or adjust it to the tone arm by which it is carried. As shown the rubber sound box body is cylindrical and is provided with an extending flanged end 4, in the interior of the rubber wall of which the diaphragm is seated. The sound box body is shown as provided with a stylus-arm pivot-support 5, mounted on a rubber extension 6, from its rubber wall and connected to an element 7, embedded in the sound box body wall and a portion of which extends through the extension 6, for that purpose, as is well understood. 8, is a ferrule which may be provided on the rubber neck 9, of the sound box body for engagement with the tone arm. There is nothing particularly new about the described sound box body which is an element of the combination constituting the present invention and of which the other element is a relatively rigid or metal concave guard ring 10, conforming to the outer surface of the rubber flange 4, and supported by it in position to protect it from distortion and provide a hand grasp, whereby the diaphragm is protected from injury and breakage while the beneficial acoustical properties of an all rubber sound box body are retained. As shown the ring or guard 10, is notched as at 11, to accommodate the rubber extension 6, which acts to separate the ring or guard from the metallic fitting 5. Since the guard or ring 10, prevents distortion of the rubber sound box body and consequently of the diaphragm it is evident that the rubber can be comparatively soft and of uniform softness throughout.

I claim:

1. In a reproducer for talking machines the combination of a diaphragm, a sound box body composed of rubber and internally grooved for the reception of the diaphragm and soft enough to endanger the diaphragm when grasped from the outside, and a metal guard carried by the body and surrounding the grooved portion thereof and by which the reproducer can be handled without endangering the diaphragm.

2. In a reproducer for talking machines the combination of a diaphragm, a cylindrical sound box body composed of rubber and provided with an externally flanged end internally grooved for the reception of the diaphragm and soft enough to endanger the diaphragm when grasped from the outside, and a relatively rigid concave guard ring conforming to the surface of the flange and supported thereby and protecting the diaphragm, substantially as described.

3. In a reproducer for talking machines the combination of a diaphragm, a sound box body composed of rubber and provided with a projecting stylus-arm pivot support and with an externally flanged end internally grooved for the reception of the diaphragm and soft enough to endanger the diaphragm, and a relatively rigid concave guard ring mounted on and confined to the flange and notched to clear the support, substantially as described.

FRED ADAMS.